(12) United States Patent
Ueda et al.

(10) Patent No.: US 9,409,179 B2
(45) Date of Patent: Aug. 9, 2016

(54) PULVERIZING APPARATUS AND PULVERIZING METHOD

(75) Inventors: Shigehisa Ueda, Tokyo (JP); Kazuo Noda, Tokyo (JP)

(73) Assignee: SUMITOMO BAKELITE COMPANY LIMITED, Tokyo (JP)

( * ) Notice: Subject to any disclaimer, the term of this patent is extended or adjusted under 35 U.S.C. 154(b) by 343 days.

(21) Appl. No.: 13/579,309

(22) PCT Filed: Feb. 21, 2011

(86) PCT No.: PCT/JP2011/053699
§ 371 (c)(1),
(2), (4) Date: Aug. 16, 2012

(87) PCT Pub. No.: WO2011/118310
PCT Pub. Date: Sep. 29, 2011

(65) Prior Publication Data
US 2012/0318896 A1    Dec. 20, 2012

(30) Foreign Application Priority Data

Mar. 26, 2010   (JP) .................................. 2010-073419

(51) Int. Cl.
*B02C 4/02* (2006.01)
*B02C 4/32* (2006.01)
(Continued)

(52) U.S. Cl.
CPC ... *B02C 4/02* (2013.01); *B02C 4/32* (2013.01); *B02C 4/44* (2013.01); *B29B 13/10* (2013.01)

(58) Field of Classification Search
CPC .............. B02C 4/30; B02C 4/44; B02C 4/02; B02C 4/32; B02C 17/1875; B02C 17/188; B02C 19/186; B02C 23/24; B02C 23/26; B29B 9/04; B29B 13/10

USPC ................. 241/38, 65–67, 227, 235, 293
See application file for complete search history.

(56) References Cited

U.S. PATENT DOCUMENTS 153,325 A * 7/1874 Evans et al. ...................... 241/67
1,564,171 A * 12/1925 Brown .............................. 241/67
(Continued)

FOREIGN PATENT DOCUMENTS

| GB | 640866 | * | 8/1950 | ............... B02C 4/44 |
| JP | 54-72565 A | | 6/1979 | |

(Continued)

OTHER PUBLICATIONS

International Search Report issued in PCT/JP2011/053699 mailed Mar. 15, 2011.

(Continued)

*Primary Examiner* — Faye Francis
(74) *Attorney, Agent, or Firm* — Birch, Stewart, Kolasch & Birch, LLP (57) ABSTRACT

A pulverizing apparatus for pulverizing a hard resin composition has a pulverizing mechanism having a pair of rollers arranged parallel to one another, these rollers pulverizing the hard resin composition by pressuring the hard resin composition between the rollers and a cooling device for cooling the hard resin composition during the hard resin composition being pulverized. Each of the rollers has a cylindrical shape with a hollow portion and the cooling device is configured to supply a coolant into the hollow portion of each of the rollers. The coolant flows in the hollow portion of each of the rollers in a longitudinal direction of each of the rollers. The cooling device has facilitating members respectively inserted into the hollow portions of the rollers.

9 Claims, 7 Drawing Sheets

(51) Int. Cl.
    *B02C 4/44*     (2006.01)
    *B29B 13/10*     (2006.01)

(56) References Cited

U.S. PATENT DOCUMENTS

| | | | | |
|---|---|---|---|---|
| 1,813,142 | A * | 7/1931 | Boudin | 165/89 |
| 1,816,307 | A * | 7/1931 | Von Reis | 165/89 |
| 1,894,618 | A * | 1/1933 | Marion | 165/279 |
| 2,696,949 | A * | 12/1954 | Grasse | 241/236 |
| 2,875,985 | A * | 3/1959 | Hold | 165/89 |
| 3,428,260 | A * | 2/1969 | Feder | 241/15 |
| 3,548,929 | A * | 12/1970 | Gross | 165/89 |
| 4,071,081 | A * | 1/1978 | Chielens et al. | 165/82 |
| 5,381,977 | A * | 1/1995 | Otte | 241/227 |
| 5,522,785 | A * | 6/1996 | Kedl et al. | 492/21 |
| 5,571,563 | A * | 11/1996 | Helms et al. | 427/288 |
| 5,983,993 | A * | 11/1999 | Watson et al. | 165/90 |
| 6,220,161 | B1 * | 4/2001 | De Vroome | 101/416.1 |
| 6,257,321 | B1 * | 7/2001 | Watson et al. | 165/90 |
| 6,810,800 | B1 * | 11/2004 | Schneider et al. | 101/217 |
| 6,992,272 | B2 * | 1/2006 | Kitano et al. | 219/619 |
| 7,023,098 | B2 * | 4/2006 | Umeno et al. | 257/787 |
| 7,025,123 | B1 * | 4/2006 | Gerndt et al. | 165/90 |
| 7,420,141 | B2 * | 9/2008 | Kitano et al. | 219/469 |
| 2002/0002208 | A1 | 1/2002 | Martel et al. | |
| 2007/0210196 | A1 | 9/2007 | Tamura et al. | |
| 2007/0235575 | A1 | 10/2007 | Resch et al. | |
| 2007/0245793 | A1 * | 10/2007 | Resch et al. | 72/241.6 |
| 2012/0299212 | A1 * | 11/2012 | Noda et al. | 264/175 |
| 2012/0318002 | A1 * | 12/2012 | Ueda et al. | 62/63 |

FOREIGN PATENT DOCUMENTS

| | | | | |
|---|---|---|---|---|
| JP | 55123415 | A * | 9/1980 | B29B 1/12 |
| JP | 57-65817 | U | 4/1982 | |
| JP | 57-148442 | U | 9/1982 | |
| JP | 58-133417 | U | 9/1983 | |
| JP | 6-52934 | U | 7/1994 | |
| JP | 8-142055 | A | 6/1996 | |
| JP | 11-189705 | A | 7/1999 | |
| JP | 2002-18837 | A | 1/2002 | |
| JP | 2002-18838 | A | 1/2002 | |
| JP | 2002-326224 | A | 11/2002 | |
| JP | 2003-517930 | A | 6/2003 | |
| JP | 2005-335321 | A | 12/2005 | |
| JP | 2006-297701 | A | 11/2006 | |
| JP | 2007-190905 | A | 8/2007 | |
| JP | 2007-301563 | A | 11/2007 | |
| TW | I270408 | B | 1/2007 | |

OTHER PUBLICATIONS

Notice of Refusal issued Jun. 24, 2014, in Japanese Patent Application No. 2010-073419, with English translation.

* cited by examiner

PULVERIZING APPARATUS AND PULVERIZING METHOD

The present invention relates to a pulverizing apparatus and a pulverizing method.

BACKGROUND OF THE INVENTION

There is known a semiconductor package in which a semiconductor chip (semiconductor element) is covered (sealed) with a resin-made sealing material. The sealing material for the semiconductor package is produced by molding a resin composition, for example, with a transfer molding method. In a process of producing the resin composition, a kneaded composition is obtained by kneading and curing plural materials. Then, the kneaded composition thus cured is pulverized by a pulverizing apparatus (for example, see patent document 1).

The pulverizing apparatus described in the patent document 1 has a housing (container) into which the kneaded composition is introduced, a rotating blade for pulverizing the kneaded composition to obtain a pulverized composition, which is rotatably supported in the housing, and a screen for adjusting a particle size of the pulverized composition. In case of using the pulverizing apparatus having a structure described above in order to pulverize the kneaded composition, the pulverized composition is heated, for example, by the rotating blade while the kneaded composition is pulverized. As a result, the pulverized composition has viscosity again. In this case, there is a problem in that a part of the pulverized composition adheres to the rotating blade as remaining materials.

Patent document 1: JP 11-189705A

SUMMARY OF THE INVENTION

It is an object of the present invention to provide a pulverizing apparatus and a pulverizing method, which are capable of reliably preventing a pulverized composition from adhering to an outer peripheral surface of each of a pair of rollers as remaining materials when these rollers pulverize a resin composition.

The above object is achieved by the present invention which is specified in the following (1) to (17).

(1) A pulverizing apparatus for pulverizing a hard resin composition, comprising:

a pulverizing mechanism having a pair of rollers arranged parallel to one another, these rollers pulverizing the hard resin composition by pressuring the hard resin composition between the rollers; and a cooling device for cooling the hard resin composition during the hard resin composition being pulverized.

(2) The pulverizing apparatus described above (1), wherein each of the rollers has a cylindrical shape with a hollow portion and the cooling device is configured to supply a coolant into the hollow portion of each of the rollers.

(3) The pulverizing apparatus described above (2), wherein the coolant flows in the hollow portion of each of the rollers in a longitudinal direction thereof, the cooling device has facilitating members for facilitating a flow of the coolant and the facilitating members are respectively inserted into the hollow portions of the rollers.

(4) The pulverizing apparatus described in above (2) or (3), wherein a temperature of the coolant is equal to or lower than 15° C.

(5) The pulverizing apparatus described in anyone of above (1) to (4), wherein the cooling device has a chamber in which cool air is supplied during the hard resin composition being pulverized and the chamber contains the rollers and the hard resin composition therein.

(6) The pulverizing apparatus described above (15), wherein at least two supply ports for supplying the cool air into the chamber are provided in the chamber and the supply ports are arranged so as to be opposite to each other through the rollers.

(7) The pulverizing apparatus described above (5) or (6), wherein a temperature of the cool air is equal to or lower than 15° C.

(8) The pulverizing apparatus described in any one of above (1) to (7), wherein each of the rollers has an outer peripheral surface constituted of a ceramic material.

(9) The pulverizing apparatus described above (8), wherein each of the rollers has a core portion containing the hollow portion and an outer layer provided on an outer periphery of the core portion, the core portion is constituted of a metallic material and the outer layer is constituted of the ceramic material.

(10) The pulverizing apparatus described in any one of above (1) to (9), wherein the rollers are configured to be capable of adjusting a center distance between axes of the rollers.

(11) The pulverizing apparatus described above (10), wherein one of the rollers is restricted so as not to be moved in a direction perpendicular to the axis of the one roller, the other roller is configured to be capable of being moved in a direction perpendicular to the axis of the other roller, and the pulverizing mechanism further has a biasing portion for biasing the other roller toward the one roller and a restricting portion for restricting the other roller not to move to the one roller over a limit of movement against a bias power from the biasing portion.

(12) The pulverizing apparatus described in any one of above (1) to (11), wherein each of the rollers has an outer diameter changing portion having an outer diameter changing along with a longitudinal direction of each of the rollers.

(13) The pulverizing apparatus described above (12), wherein the outer diameter changing portion has the outer diameter gradually increasing from a center portion of the roller toward both end portions of the roller.

(14) The pulverizing apparatus described above (12), wherein the outer diameter changing portion has the outer diameter gradually decreasing from a center portion of the roller toward both end portions of the roller.

(15) The pulverizing apparatus described in any one of above (1) to (14), wherein the hard resin composition has a sheet shape immediately prior to being pulverized by the pulverizing apparatus.

(16) The pulverizing apparatus described in any one of above (1) to (15), wherein the hard resin composition thus pulverized is used as a molding portion constituting an outer packaging of an IC package.

(17) A pulverising method for pulverizing a hard resin composition using a pair of rollers, the method comprising:

pulverizing the hard resin composition by pressuring the hard resin composition between the rollers, and cooling the hard resin composition during the hard resin composition being pulverized by the rollers.

DETAILED DESCRIPTION OF THE PREFERRED EMBODIMENT

Hereinbelow, a pulverizing apparatus and a pulverizing method according to the present invention will be described in detail based on the preferred embodiments shown in the accompanying drawings.

<First Embodiment>

Figure 1:
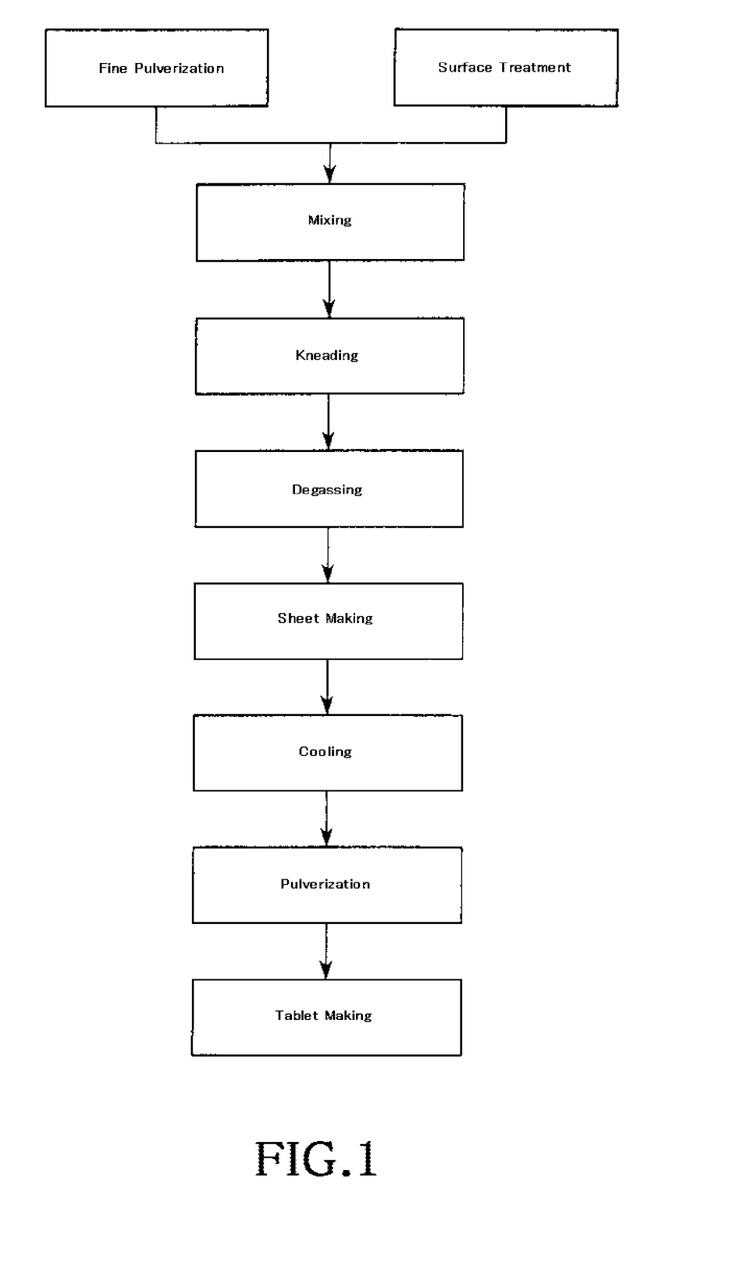
FIG. 1 is a process chart showing a producing process of a resin composition.
Figure 2:
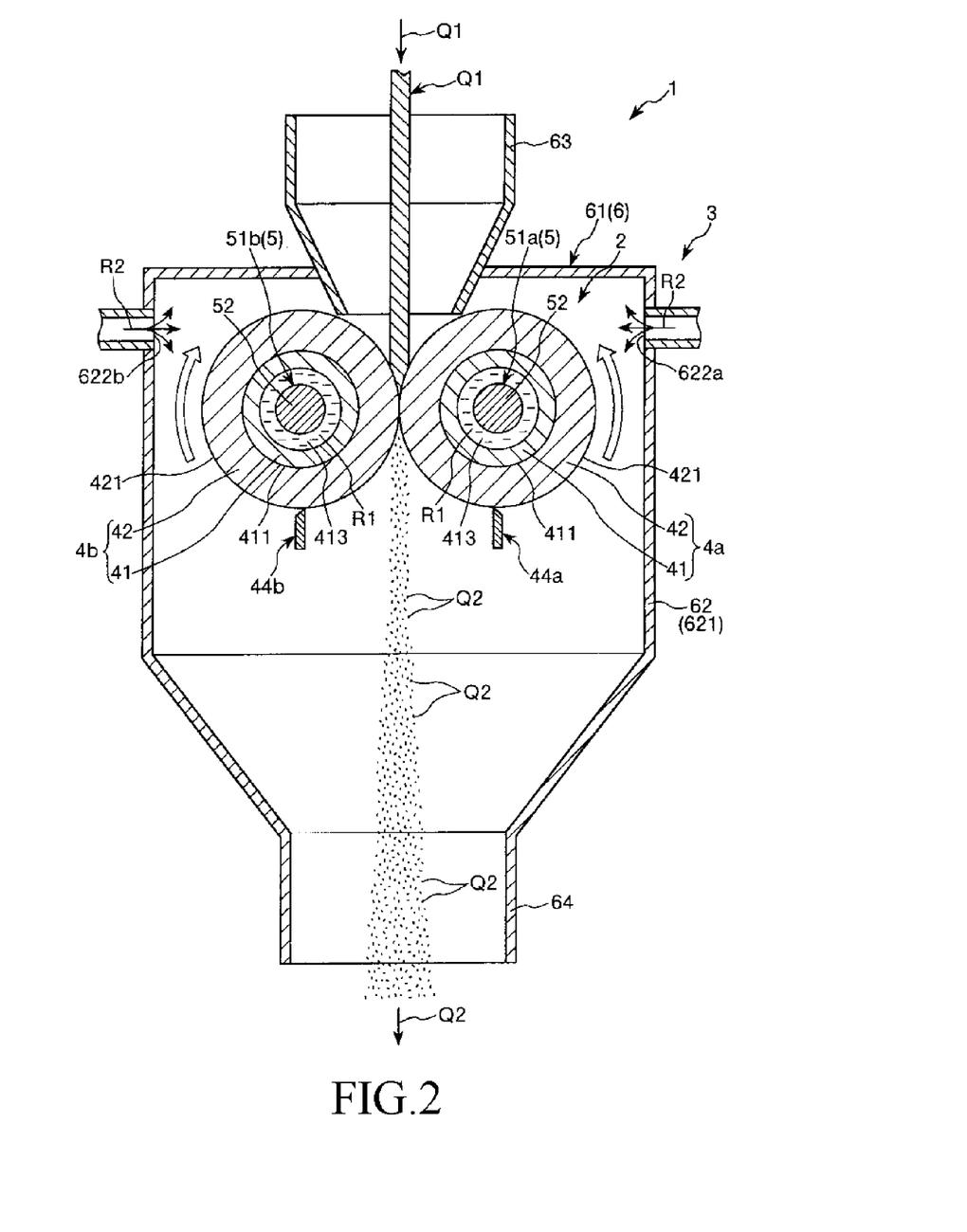
FIG. 2 is a cross section view showing a pulverizing apparatus according to a first embodiment of the present invention.
Figure 3:
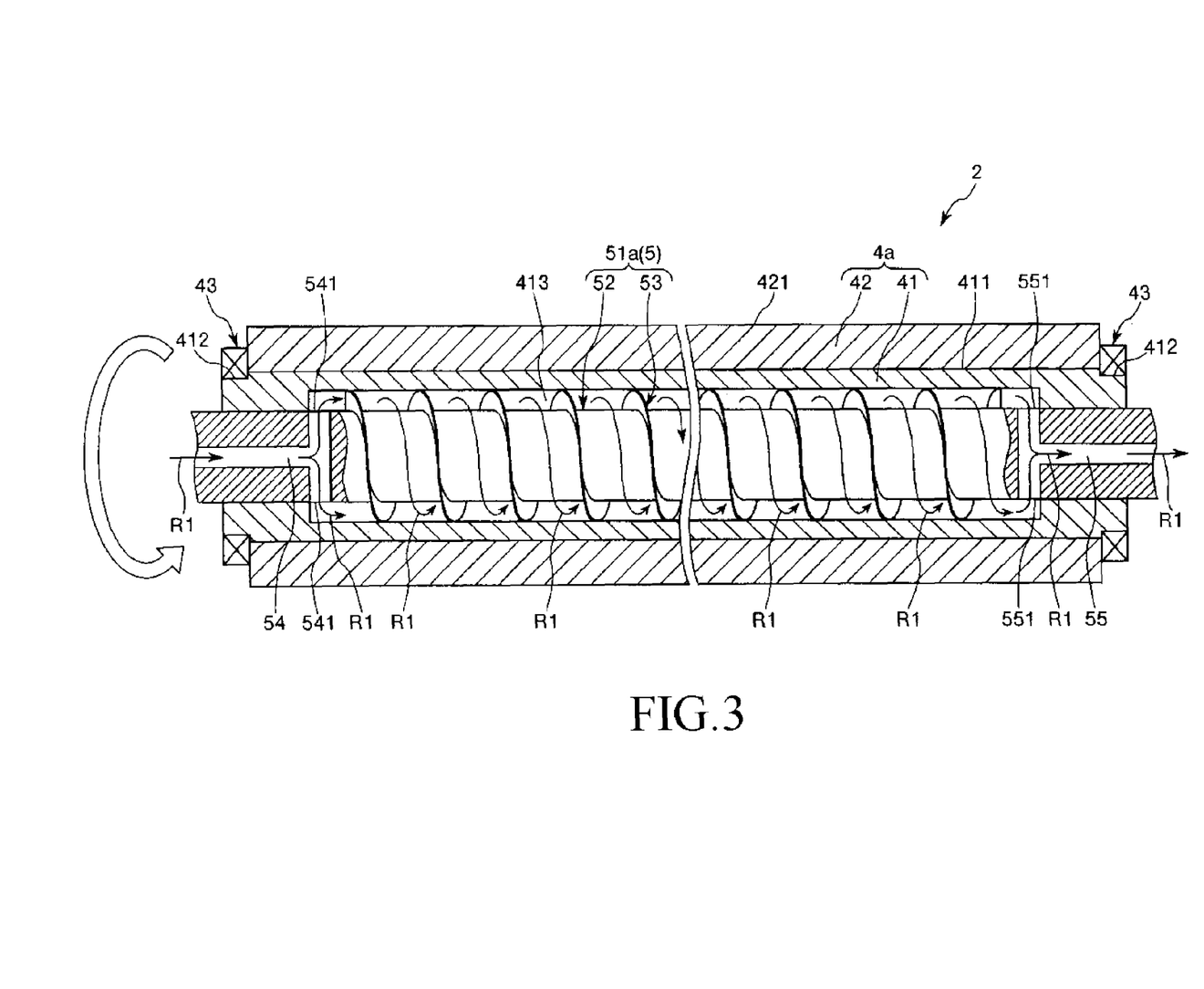
FIG. 3 is a partial cross section view showing a roller of the pulverizing apparatus shown in FIG. 2.
Figure 7:
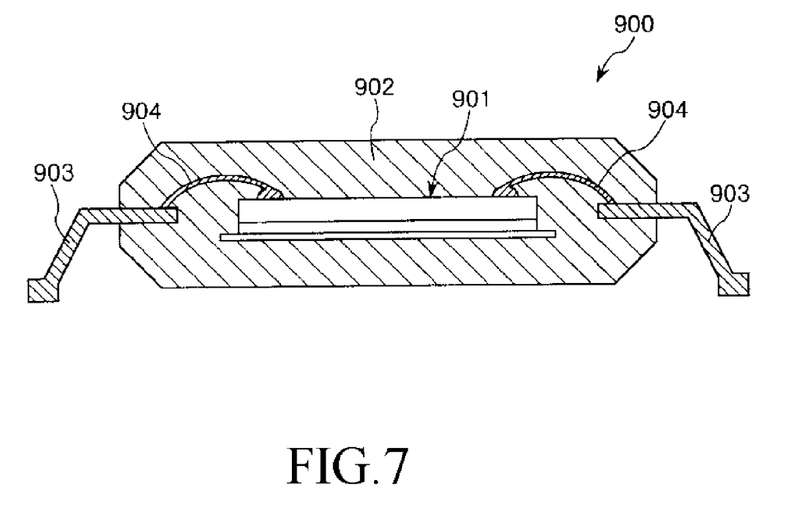
FIG. 7 is a partial cross section view showing an IC package using a resin composition.

FIG. 1 is a process chart (view) showing a producing process of a resin composition. FIG. 2 is a cross section view showing a pulverizing apparatus according to a first embodiment of the present invention. FIG. 3 is a partial cross section view showing a roller of the pulverizing apparatus shown in FIG. 2. FIG. 7 is a partial cross section view showing an IC package using a resin composition. In the following description, the upper side of FIGS. 2, 4 and 7 will be referred to as "upper" or "upper side", the lower side will be referred to as "lower" or "downstream". Further, the left side of FIG. 3 will be referred as "left" and the right side of FIG. 3 will be referred as "right".

A pulverizing apparatus 1 of the present invention shown in FIG. 2 is a device used in a pulverizing process to produce a resin composition. This resin composition is finally molded into a molded body. Prior to describing the pulverizing apparatus 1, description will be first given to the overall producing process which begins with the supply of raw materials and ends with the production of the resin composition.

At first, individual materials as raw materials of the resin composition are prepared. The raw materials include a resin, a curing agent and a filler material (fine particle). If necessary, the raw materials may further include a curing accelerator and a coupling agent. It is preferable to use an epoxy resin as the resin.

Examples of the epoxy resin include a cresol novolac type resin, a biphenyl type epoxy resin, a dicyclopentadiene type epoxy resin, a triphenol methane type epoxy resin and a multi-ring aromatic type epoxy resin.

Examples of the curing agent include a phenol novolac type resin, a phenol aralkyl type resin, a triphenol methane type resin and a multi-ring aromatic resin.

Examples f the filler material include a fused silica (having a crushed shape or a spherical shape), a crystalline silica and an alumina.

Examples of the curing accelerator include a phosphor compound and an amine compound. Examples of the coupling agent include a silane compound and so forth.

Specific one of the materials stated above may be excluded from the raw materials. Other materials than set forth above may be further included in the raw materials. Examples of the other materials include a coloring agent, a releasing agent, a stress-reducing agent and a flame retardant.

Examples of the flame retardant include a brominated epoxy resin, an antimony oxide-based flame retardant, a non-halo- and non-antimony-based flame retardant. Examples of the non-halo- and non-antimony-based flame retardant include an organic phosphor, a metal hydrate and a nitrogen-containing resin.

(Fine Pulverization)

As shown in FIG. 1, specific materials among the raw materials are first pulverized (finely pulverized) by a first pulverizing apparatus such as a continuous rotary ball mill to have a specified particle size distribution. Examples of the raw materials to be pulverized include the resin, the curing agent, the curing accelerator and other materials except the filler materials. A part of the filler materials may be added into the raw materials to be pulverized.

(Surface Treatment)

A specified material among the raw materials, for example, all or a part (remaining part) of the filler materials, is subjected to a surface treatment. In the surface treatment, for example, the coupling agent adheres to a surface of the filler material. The fine pulverization and the surface treatment may be performed either simultaneously or one after the other.

(Mixing)

Next, a composition containing the above raw materials is thoroughly mixed by a mixing device to thereby obtain a mixed composition. As the mixing device, it is possible to use, for example, a high-speed mixing device having a rotating blade.

(Kneading)

Next, the mixed composition is kneaded by a kneading device. As the kneading device, it is possible to use, for example, a kneading extruder such as a single-axis type kneading extruder or a double-axis type kneading extruder, or a roll type kneader such as a mixing roll and so forth.

(Degassing)

Next, the mixed composition thus kneaded (resin composition) is degassed by a degassing device. This degassing process can be performed by a vacuum pump connected with a discharge passage of the kneading device. The discharge passage of the kneading device discharges the resin composition thus kneaded.

(Sheet Making)

Next, the resin composition thus degassed is molded into a sheet shape by a molding device. As a result, a sheet shaped material (hereinbelow referred as "sheet shaped material Q1") is obtained. As the molding device, it is possible to use, for example, a device having a pair of rollers for molding the resin composition into the sheet shape by pressuring the resin composition between the rollers.

(Cooling)

Next, the sheet shaped material Q1 is cooled by a cooling device. The sheet shaped material Q1 is hardened (becomes hard) by cooling. This makes it possible to easily and reliably perform pulverization of the sheet shaped material Q1 in a next process. As the cooling device, it is possible to use, for example, a device configured to supply cool air to the sheet shaped material Q1.

(Pulverization)

Next, the sheet shaped material Q1 is pulverized by a pulverizing apparatus 1 to have a specified particle size distribution. As a result, a pulverized composition (hereinbelow referred as "pulverized composition Q2") is obtained. The pulverizing apparatus 1 will be described later.

(Tablet Making)

Next, a number of the pulverized composition Q2 are compression-molded by a compact manufacturing device (tablet-making device) to obtain a resin composition in the form of compacts.

As shown in FIG. 7, the resin composition is used for, for example, covering (sealing) a semiconductor chip (IC chip) 901. And the resin composition is used as a molding portion 902 constituting an outer packaging of a semiconductor package (IC package) 900. This makes it possible to protect the semiconductor chip 901 with the molding portion 902. In order to cover the semiconductor chip 901 with the resin composition, the resin composition is molded by a transfer molding method and so forth, and then the semiconductor chip 901 is covered with the resin composition. The semiconductor package 900 shown in FIG. 7 has plural lead frames 903 protruding from the molding portion 902. Each of the lead frames 903 is electrically connected with the semiconductor chip 901 through a wire 904 constituted of a metallic material having conductive property, such as gold and so forth.

The tablet-making process may be omitted and the pulverized composition Q2 may be used as the resin composition in the form of the compacts. In this case, the pulverized composition Q2 is molded by, for example, a compression-molding or an injection-molding method to form a sealing material.

Next, description will be given to the pulverizing apparatus 1. The pulverizing apparatus 1 shown in FIG. 2 is a device for performing a pulverizing method of the present invention. Namely, the pulverizing apparatus 1 pulverizes the sheet shaped material Q1 by pressuring the sheet shaped material Q1 and simultaneously cools the sheet shaped material Q1.

The pulverizing apparatus 1 has a pulverizing mechanism 2 for pulverizing the sheet shaped material Q1 and a cooling device (cooling mechanism) 3 for cooling the sheet shaped material Q1 (the pulverized composition Q2) during the sheet shaped material Q1 being pulverized. Hereinbelow, description will be given to each component constituting the pulverizing apparatus The pulverizing mechanism 2 has a pair of rollers 4a, 4b arranged parallel to one another. In the pulverizing apparatus 1, the sheet shaped material Q1 can be pulverized by pressurizing between the rollers 4a, 4b. In this way, the pulverizing mechanism 2 is configured to pulverize the sheet shaped material Q1 between the rollers 4a, 4b to obtain the pulverized composition of a powder form. The pulverizing mechanism 2 has a different structure from, for example, a structure of a Mass Colloider (available from Masuko Sangyo Co., Ltd.). In the pulverizing mechanism 2, the pulverized composition Q2 produced by pulverizing the sheet shaped material Q1 has a specified particle size distribution in a state that equal to or more than 20% of the pulverized composition Q2 of the powder form has a particle size of less than 0.2 mm, 50 to 80% of the pulverized composition Q2 has a particle size of 0.2 to 2.4 mm and equal to or less than 10% of the pulverized composition Q2 has a particle size of more than 2.4 mm. A thickness of the sheet shaped material Q1 to be pulverized is preferably equal to or less than 5 mm, and is more preferably in the range of 0.5 to 3 mm. This makes it possible to easily pulverize and easily cool the sheet shaped material Q1. In this regard, the sheet shaped material Q1 may be repeatedly pulverized by the pulverizing apparatus 1 in order to sufficiently pulverize the sheet shaped material Q1.

Hereinbelow, since structures of the roller 4a and structures of the roller 4b are substantially identical to each other, the roller 4a will be representatively described.

As shown in FIGS. 2 and 3, the roller 4a has a cylindrical shape. Namely, the roller 4a has a core portion 41 having a hollow structure and an outer periphery (outer peripheral portion) 411, and an outer layer 42 provided on the outer periphery 411 of the core portion 41.

Both end portions of the core portion 41 respectively have small diameter portions 412 whose outer diameter is smaller than other areas of the core portion 41 (see FIG. 3). Each of the small diameter portions 412 is held by a shaft bearing 43 (inserted into a shaft bearing 43). Since one of the end portions of the core portion 41 is connected with a motor (not shown) it is possible to rotate the roller 4a. In this regard, one of end portions of the roller 4b may be connected with another motor and the number of rotation of the roller 4a may be set different from the number of rotation of the roller 4b.

A constituent material of the core portion 41 is not particularly limited to a specific material. Examples of the constituent material include various metallic materials such as a stainless steel and so forth.

The outer layer 42 is provided on the outer periphery 411 of the core portion 41 except areas on which the small diameter portions 412 are formed. The outer layer 42 has an outer peripheral surface 421 for pressurizing the sheet shaped material Q1 to produce the pulverized composition Q2 of the powder form.

The outer layer 42 is constituted of a ceramic material. The ceramic material is not particularly limited to a specific material. Examples of the ceramic material include an oxide ceramic such as an, alumina, a silica, a titania, a zirconia, a yttria or a calcium phosphate, a nitride ceramic such as a silicon nitride, an aluminum nitride, a titanium nitride or a boron nitride, a carbide ceramic such as a tungsten carbide or the like, and a composite ceramic containing a combination of two or more of the above ceramic materials. Among the above ceramic materials, it is preferable to use a ceramic material containing the oxide ceramic.

In a case in which the outer layer 42 is constituted of the ceramic material, even if fragments of the outer peripheral surface 421 are produced by friction between the sheet shaped material Q1 and the outer peripheral surface 421 of the outer layer 42 during the sheet material Q1 being pressurized, the fragments of the outer peripheral surface 421 are obviously constituted of the ceramic material. In contrast, in a case in which the outer peripheral surface 421 the outer layer 42 is constituted of a metallic material, if pulverized metals are produced by the friction between the sheet shaped material Q1 and the outer peripheral surface 421 of the outer layer 42 during the sheet shaped material Q1 being pressurized, the pulverized metals are mixed into the pulverized composition Q2. However, in the pulverizing apparatus 1, it is possible to prevent the pulverized metals from being mixed into the pulverized composition Q2 In addition, even if the fragments are mixed into the pulverized composition Q2, the pulverized composition Q2 has satisfactory properties for using as the molding portion 902 of the semiconductor package 900 because the fragments are constituted of the ceramic material. Similarly, a surface of the shaft bearing 43 and a surface of each of the small diameter portions 412 maybe constituted of the ceramic material or a nonmetallic material such as a resin material.

A pulverizing apparatus described in the patent document 1 (JP 11-189705A) has a container in which a kneaded composition is introduced, a rotating blade for pulverizing the kneaded composition to produce a pulverized composition, which is rotatably supported in the container and a screen for adjusting a particle size of the pulverized composition. The container, the rotaging blade and the screen are constituted of, for example, a magnetic material such as a maritensitic-based special use stainless (SUS). Because of structures of these components, it is difficult to constitute these components, in particular the screen, with a nonmetallic material. In addition, these components, in particular the screen, are drastically worn away by materials to be pulverized. Therefore, in the pulverizing apparatus described in the patent document 1, it is necessary to remove pulverized magnetic material from the pulverized composition by an iron-removal device in order to prevent metallic foreign substances form being mixed into the pulverized composition. In contrast, in the pulverizing apparatus 1 of the present invention, it is unnecessary to use a screen which is indispensable component for an impact type pulverizing apparatus such as the pulverizing apparatus described in the patent document 1. As a result, it is possible to reliably prevent the metallic foreign substances produced in the pulverizing process from being mixed into the pulverized composition Q2.

In a ease in which the outer layer 42 is constituted of the ceramic material (nonmetallic material), a Vickers hardness Hv (defined in JIS Z 2244) of the outer layer 42 at 500 gf load is not particularly limited to a specific value, but is preferably equal to or more than 1300, and is more preferably in the range of 1500 to 1700. This makes it possible to reliably prevent the outer layer 42 from getting broken.

As shown in FIG. 2, the pulverizing mechanism 2 has scrapers 44a, 44b respectively provided at a side of the roller 4a and a side of the roller 4b. When the pulverized composition Q2 adheres to and remains on the outer peripheral surface 421 of the outer layer 42, the scraper 44a can remove the pulverized composition Q2 thus remaining from the outer peripheral surface 421 of the outer layer 42 by contacting with the outer peripheral surface 421 of the outer layer 42. Similarly, when the pulverized composition Q2 adheres to and remains on the outer peripheral surface 421 of the roller 4b, the scraper 44b can remove the pulverized composition Q2 thus remaining from the outer peripheral surface 421 of the roller 4b.

As shown in FIG. 2, the cooling device 3 has a first cooling mechanism 5 for cooling the pulverized composition Q2 (sheet shaped material Q1) with a liquid coolant R1 and a second cooling mechanism 6 for cooling the pulverized composition Q2 (sheet shaped material Q1) with cool air R2.

The first cooling mechanism 5 has a supply unit (not shown) for supplying the coolant R1 into hollow portions 413 of the core portions 41 of the rollers 4a, 4b. The supply unit may be constituted of, for example, a tank for storing the coolant R1, a connecting tube for connecting the tank with the hollow portions 413 of the core portions 41 of the rollers 4a, 4b, and a pump for delivering the coolant R1. This makes it possible to deliver the coolant R1 from a left side to a right side of the rollers 4a, 4b. In other words, it is possible to deliver the coolant R1 along with a longitudinal direction of the rollers 4a, 4b (see FIG. 3).

As described above, the core portion 41 of the roller 4a is constituted of the metallic material and the outer layer 42 of the roller 4a is constituted of the ceramic material. This makes it possible for the outer layer 42 to absorb heat from the sheet shaped material Q1 or the pulverized composition Q2 and then to transfer the heat to the coolant R1 through the core portion 41. As a result, the heat form the sheet shaped material Q1 or the pulverized composition Q2 is effectively transferred to the coolant R1, thereby it is possible to reliably cool the sheet shaped material Q1 or the pulverized composition Q2. Due to this cooling process, it is possible to prevent the pulverized composition Q2 from absorbing, for example, heat generated by friction between the pulverized composition Q2 and the outer peripheral surface 421 of the roller 4a, and to prevent the sheet shaped material Q1 from remaining heat. This makes it possible to reliably prevent the pulverized composition Q2 from adhering to and remaining on the outer layer 42 of the roller 4a.

It is preferable to make a clearance between the outer layer 42 of the roller 4a and the outer layer 42 of the roller 4b. The clearance is preferably in the range of 0.5 to 3 mm, and is more preferably in the range of 1 to 2 mm. This makes it possible to make a particle size distribution of the pulverized composition Q2 produced by pulverizing the sheet shaped material Q1 within a predetermined range. A constituent material of the outer layer 42 is the ceramic material having a lower thermal expansion coefficient than a metallic material. By constituting the outer layer 42 with the ceramic material having the lower thermal expansion coefficient and setting the clearance to fall within the above range, if outer diameters of the rollers 4a, 4b are increased by thermal expansion, it is possible to prevent the outer layers 42 of the rollers 4a, 4b from contacting with each other. As a result, it is possible to prevent the rollers 4a, 4b from getting broken and to easily keep the clearance within the above range.

The first cooling mechanism 5 has a first facilitating member 51a inserted into the hollow portion 413 of the roller 4a and a second facilitating member 51b inserted into the hollow portion 413 of the roller 4b. Since structures of the first facilitating member 51a and the second facilitating member 51b are substantially identical to each other, the first facilitating member 51a will be representatively described.

As shown in FIG. 3, the first facilitating member 51a has a main body 52 having a columnar shape and an outer surface, and a projecting portion 53 outwardly projecting from the outer surface of the main body 52.

The main body 52 has an inflow passage 54 for introducing the coolant R1 into the hollow portion 413 of the roller 4a, which is formed at a left end portion of the main body 52, and an outflow passage 55 for discharging the coolant R1 passing in the hollow portion 413 of the roller 4a, which is formed at a right end portion of the main body 52. Both of the inflow passage 54 and the outflow passage 55 are constituted of a through hole passing through the main body 52.

The inflow passage 54 has a plurality of apertures 541 provided on an outer surface of the main body 52. The inflow passage 54 is in communicating with the hollow portion 413 through each of the apertures 541. This makes it possible to introduce the coolant R1 into the hollow portion 413 of the roller 4a through the inflow passage 54. It is preferred that each of the plurality of apertures 541 are arranged at equal intervals in a circumferential direction of the outer surface of the main body 52.

The outflow passage 55 has a plurality of apertures 551. The outflow passage 55 is in communicating with the hollow portion 413 through each of the plurality of apertures 551. This makes it possible to discharge the coolant R1 from the hollow portion 413 through the outflow passage 55. It is preferred that the plurality of apertures 551 are arranged at equal intervals in the circumferential direction of the outer surface of the main body 52.

The projection portion 53 is provided between the apertures 541 of the inflow passage 54 and the apertures 551 of the outflow passage 55. The projection portion 53 is formed in a spiral form around an axis of the main body 52.

The facilitating member 51a is connected with a motor (not shown) at either a left end portion side or a right end portion side of the facilitating member 51a. Thus, when the motor drives, whole of the roller 4a including the facilitating member 51a can rotate around an axis of the roller 4a. Due to this rotation, the coolant R1 is pushed to a right side without retention by the projection portion 53 having the spiral form. Therefore, the coolant R1 can rapidly and reliably pass through an inside of the hollow portion 413 of the roller 4a (see FIG. 3). This makes it possible to efficiently provide a cooling effect. In this manner, in order to prevent an imbalance of cooling, the facilitating member 51a spirally and uniformly delivers the coolant R1 with a hydraulic pressure. This makes it possible to improve cooling efficiency. As a result, it is possible for the coolant R1 to efficiently, namely rapidly, absorb the heat.

A constituent material of the facilitating member 51a is not particularly limited to a specific material. Examples of the constituent materials include various metallic materials such as a stainless steel and so forth, and various resin materials such as a polyamide resin and so forth.

A temperature of the coolant R1 is not particularly limited to a specific value, but is preferably equal to or lower than 15° C., and more preferably in the range of −5 to 5° C. In a case in which a temperature of the sheet shaped material Q1 immediately prior to passing between the rollers 4a, 4b is, for example, equal to or lower than 10° C., by setting the temperature of the coolant R1 to fall within the above range, it is possible to cool and pulverize the sheet shaped material Q1 appropriately. As a result, it is possible to produce the pulverized composition Q2 maintained in a cooling state without the pulverized composition Q2 adhering to the outer peripheral surface 421 of the rollers 4a, 4b. This makes it possible to reliably prevent the pulverized composition Q2 from remaining on the outer layer 42 of the roller 4a (the same applies to the roller 4b).

The coolant R1 is not particularly limited to a specific material. Examples of the coolant R1 include water, oil, inorganic brine and organic brine. As shown in FIG. 2, the second cooling mechanism 6 has a chamber 61 and a supply unit (not shown) for supplying the cool air R2 into the chamber 61.

The chamber 61 can contain the sheet shaped material Q1 and the pulverized composition Q2 as well as the rollers 41, 4b. The chamber 61 has a main body 62, an introducing port 63 provided on an upper portion of the main body 62 and a discharging port 64 provided on a lower portion of the main body 62.

The main body 62 is a box shaped portion having an sufficient size for containing the rollers 4a, 4b in the main body 62. The main body 62 has a side wall 621 and two supplying port 622a, 622b for supplying the cool air R2, which are provided at the side wall 621 of the main body 62. The chamber 61 is filled with the cool air R2 supplied through the supplying port 622a, 622b. This makes it possible to maintain an inside of the chamber 62 in a cooling state. Due to a combination of cooling of the cool air R2 and cooling of the coolant R1, it is possible to more reliably prevent the pulverized composition Q2 from adhering to the outer layers 42 of the rollers 4a, 4b.

The supplying ports 622a, 622b are arranged so as to opposite to each other through the rollers 4a, 4b in a horizontal direction perpendicular to the rollers 4a, 4b. The main body 62 may further have a plurality of pairs of the supplying ports 622a, 622b. Due to an above arrangement of the supplying ports 622a, 622b, it is possible to rapidly and directly blow the cool air (cool wind) R2 from the supplying ports 622a, 622b to the sheet shaped material Q1 and outer peripheral surface 421 of the rollers 4a, 4b. Since the sheet shaped material Q1 is cooled by directly blowing the cool air (cool wind) R2, the sheet shaped material Q1 is in contact with the cool air R2 during the sheet shaped material Q1 being pulverized. Namely, the pulverized composition Q2 is produced during the sheet shaped material Q1 being cooled. The pulverized composition Q2 thus cooled is prevented from adhering to and remaining on the outer layers 42 of the rollers 4a, 4b. Further, the outer peripheral surface 421 of the rollers 4a, 4b may be simultaneously cooled by directly blowing the cool air (cool wind) R2. This makes it possible to compensate for insufficient cooling caused by a thermal conductivity of the outer layer 42 (ceramic material) being lower than a thermal conductivity of the core portion 41 (metallic material).

The arrangement and the number of the supplying ports 622a, 622b are not particularly limited to the above arrangement and number. The arrangement of the supplying ports 622a, 622b may be any arrangements being capable of supplying the cool air R2 into the chamber 61. For example, the arrangement may be an arrangement being capable of blowing the cool air (cool wind) R2 to only the sheet shaped material Q1 or an arrangement being capable of only supplying the cool air R2 into the chamber 61 without blowing the cool air R2 to a specific portion. Any arrangements of the supplying ports 622a, 622b described, above can improve an effect for producing the pulverized composition Q2 maintained in the cooling state without the pulverized composition Q2 adhering to the outer peripheral surfaces 421 of the rollers 4a, 4b.

The introducing port 63 is a portion for introducing the sheet shaped material Q1. The introducing port 63 has a cylindrical shape.

The discharging port 64 is a portion for discharging the pulverized composition Q2. The discharging port 64 has a cylindrical shape as the introducing port 63 has.

In the configuration shown in FIG. 2, the chamber 61 is constituted by combining a plurality of plate members appropriately. It is preferred that each of the plate members is covered with a thermal insulating material or has the thermal insulating material embedded therein.

There is a possibility that the sheet shaped material Q1 to be pulverized and the pulverized composition Q2 thus pulverized contact with the introducing port 63, the discharging port 64 or the chamber 61. Thus, at least each of surfaces of inner walls of the introducing port 63, the discharging port 64 and the chamber 61 is preferably constituted of a nonmetallic material such as a ceramic material, a resin material and so forth. Since at least these surfaces of the inner walls are constituted of the nonmetallic material, even if fragments of the inner walls are produced by friction and then the fragment is mixed into the pulverized composition Q2, the pulverized composition Q2 has satisfactory properties for using as the molding portion 902 of the semiconductor package 900.

The supply unit for supplying the cool air R2 may be constituted of a pump for delivering the cool air R2 and a connecting tube for connecting the pump with the introducing ports 622a, 622b.

A temperature of the cool air R2 is not particularly limited to a specific value, but is preferably equal to or lower than 15° C., and more preferably in the range of −5 to 5° C. A humidity of the cool air R2 is not particularly limited to a specific value, but is preferably equal to or lower than 40%, and more preferably in the range of 0 to 20%. By setting the temperature and the humidity of the cool air R2 to fall within the above ranges, it is possible to cool the sheet shaped material Q or the pulverized composition Q2 under a condition below dew point. As a result, it is possible to prevent dew from being formed on the sheet shaped material Q1 or the pulverized composition Q2.

The cool air R2 is riot particularly limited to a specific material. Examples of the cool air R2 include air, carbon dioxide and inert gas such as nitrogen. In order to ensure safety, it is preferable to use the air among the above materials.

<Second Embodiment>

Figure 4:
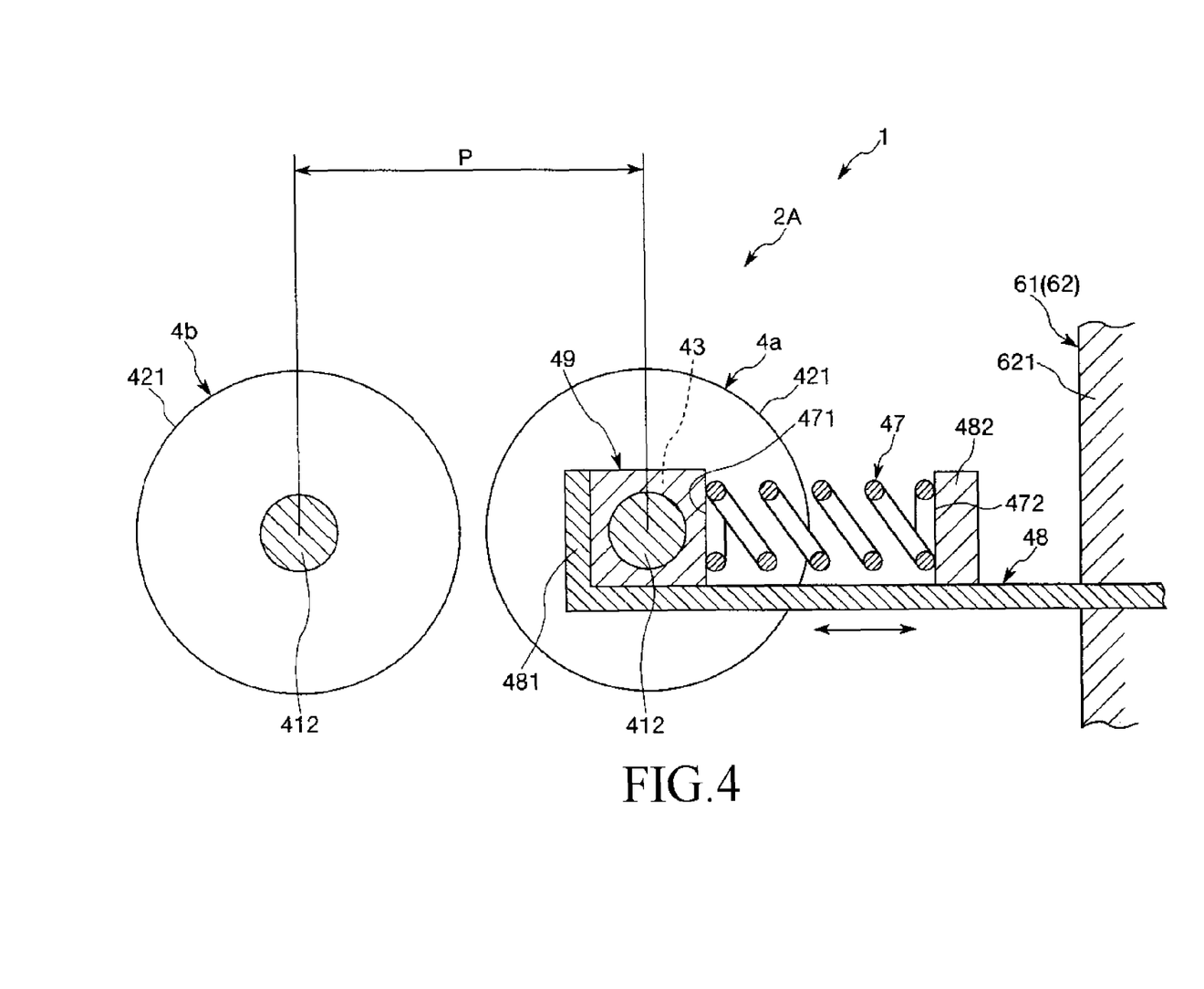
FIG. 4 is a cross section view showing a pulverizing apparatus according to a second embodiment of the present invention.

FIG. 4 is a cross section view showing a second embodiment of the present invention.

Hereinbelow, description will be given to the second embodiment of the present invention with reference to FIG. 4. The second embodiment of the pulverizing apparatus and the pulverizing method will be described by placing emphasis on the points differing from the first embodiment of the pulverizing apparatus and the pulverizing method, with the same matters omitted from the description. The pulverizing apparatus and the pulverizing method according to the second embodiment are the same as the pulverizing apparatus and the pulverizing method according to the first embodiment, except the structure of the pulverizing mechanism.

The pulverizing mechanism 2A shown in FIG. 4 is configured to be capable of adjusting a center distance P between axes of the rollers 4a, 4b. Hereinbelow, descriptions will be given to the pulverizing mechanism 2A.

The roller 4a is configured to be capable of being moved in a direction perpendicular to the axis thereof, that is a horizontal direction (a left right direction in FIG. 4). In contrast, the roller 4b is restricted so as riot to be moved in a direction perpendicular to the axis of the roller 4b.

The pulverizing mechanism 2A has a coil spring (biasing portion) 47 for biasing the roller 4a toward the roller 4b and an arm (restricting portion) 48 for restricting the roller 4a not to move to the roller 4b over a limit of movement.

One end portion 471 of the coil spring 47 contacts with a housing 49 containing the shaft bearing 43 rotatably supporting the roller 4a. Further, another end portion 472 of the coil spring 47 contacts with a fixing member 482 provided on the arm 48. As a result, the coil spring 47 is in compression. This makes it possible to push the roller 4a to the roller 4b and pressurize the sheet shaped material Q1 between the rollers 4a, 4b.

The arm 48 is supported by the side wall 621 of the chamber 61 in a state that the arm 48 can be moved in a longitudinal direction of the arm 48. The arm 48 has one end portion 481 bent into an L shape and contacting with one side of the housing 47 opposite to another side of the housing 47 contacting with the other end portion 472 of the coil spring 47. As described above, although the roller 4a is biased by the coil spring 47, the one end portion 481 of the arm 48 can restrict the roller 4a not to move to the roller 4b over the limit of movement against a bias power from the coil spring 47. This makes it possible to adjust the center distance P between the axes of the rollers 4a, 4b and keep the center distance P thus adjusted. Further, it is possible to adjust a pressure of the coil spring 47 by sliding the fixing member 482. A clearance adjusting device constituted of the arm 48 and the chamber 61 may be provided at one of the rollers 4a, 4b and a pressure adjusting device constituted of the housing 49, the coil spring 47 and the fixing member 482 may be provided at another of the rollers 4a, 4b. For example, the clearance adjusting device is provided at the roller 4a and the pressure adjusting device is provided at the roller 4b. In this case, in order to prevent one of the rollers 4a, 4b at which the clearance adjusting device is provided from moving in a vertical direction in FIG. 4 after adjusting the clearance, the one end portion 481 of the arm 48 has a U shape, a reversed U shape or a rectangular shape.

Since the pulverizing mechanism 2A has the above structure, it is possible to adjust a particle size of the pulverized composition Q2 by pulverizing the sheet shaped material Q1 with a predetermined pressure when the sheet shaped material Q1 is pulverized to produce the pulverized composition Q2.

The pulverizing mechanism 2A may be configured to detect the temperature of the coolant R1 and then adjust the center distance P between the axes of the rollers 4a, 4b according to the detected temperature of the coolant R1.

<Third Embodiment>

Figure 5:
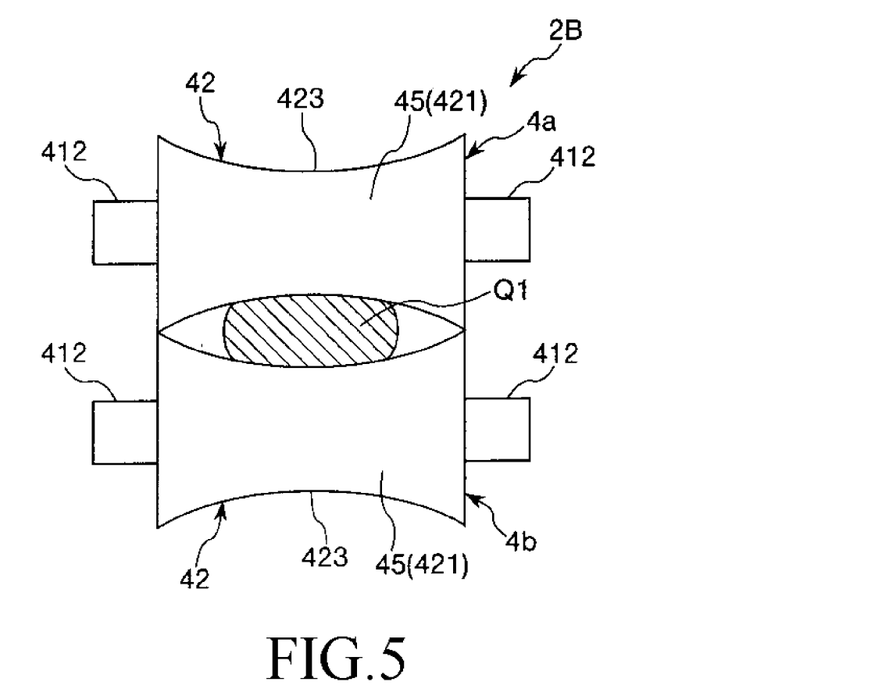
FIG. 5 is a plane view (cross section view) showing rollers of a pulverizing apparatus according to a third embodiment of the present invention.
Figure 6:
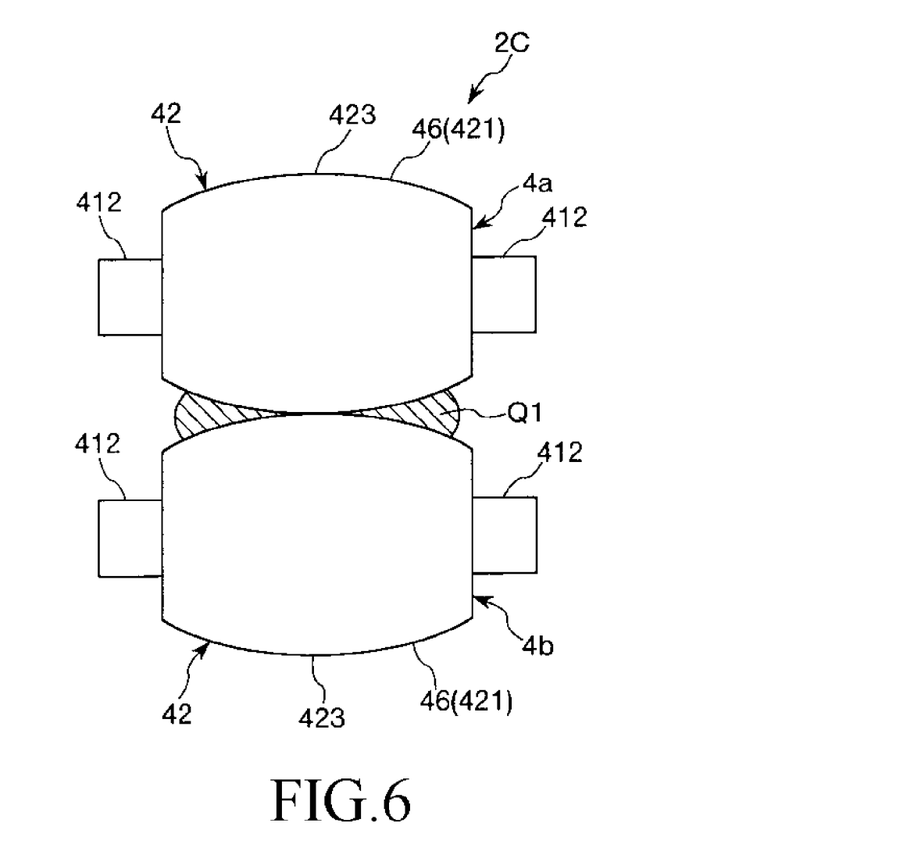
FIG. 6 is a plane view (cross section view) showing rollers of a pulverizing apparatus according to a fourth embodiment of the present invention.

FIG. 5 is a plane view (cross section view) exaggeratingly showing rollers of a pulverizing apparatus according to a third embodiment of the present invention. In FIGS. 5 and 6, a longitudinal direction of the roller is shortened and a radial direction of the roller is extended for easily understanding. Therefore, a ratio of the longitudinal direction and the radial direction of the roller is different from an actual ratio.

Hereinbelow, description will be given to the third embodiment of the present invention with reference to FIG. 5. The third embodiment of the pulverizing apparatus and the pulverizing method will be described by placing emphasis on the points differing from the first and the second embodiments of the pulverizing apparatus and the pulverizing method, with the same matters omitted from description.

The pulverizing apparatus and the pulverizing method according to the third embodiment are the same as the pulverizing apparatus and the pulverizing method according to the first embodiment, except the forms of the rollers of the pulverizing mechanism.

In a pulverizing mechanism 213 shown in FIG. 5, each of the rollers 4a, 4b has an outer diameter changing portion 45 formed on the outer layer 42. The outer diameter changing portion 45 has an outer diameter changing along with the longitudinal direction of the roller. Namely, the outer diameter changing portion 45 has the diameter gradually increasing from a center portion 423 of the roller toward each of the small diameter portions (end portions) 412 of the roller.

In the pulverizing mechanism 2b having the above structure, the sheet shaped material Q1 is gathered to the center portions 423 of the rollers 4a, 4b and then pulverized. This makes it possible to prevent the sheet shaped material Q1 from extending over the rollers 4a, 4b. As a result, it is possible to reliably pulverize the sheet shaped material Q1.

<Fourth Embodiment>

FIG. 6 is a plane view (cross section view) showing tellers of a pulverizing apparatus according to a fourth embodiment of the present invention.

Hereinbelow, description will be given to the fourth embodiment of the present invention with reference to FIG. 6. The fourth embodiment of the pulverizing apparatus and the pulverizing method will be described by placing emphasis on the points differing from the first, the second and the third embodiments of the pulverizing apparatus and the pulverizing method, with the same matters omitted from description.

The pulverizing apparatus and the pulverizing method according to the fourth embodiment are the same as the pulverizing apparatus and the pulverizing method according to the first embodiment, except the forms of the rollers of the pulverizing mechanism.

In a pulverizing mechanism 2C shown in FIG. 6, each of the rollers 4a, 4b has an outer diameter changing portion 46 formed on the outer layer 42. The outer diameter changing portion 46 has an outer diameter changing along with the longitudinal direction of the roller. Namely, the outer diameter changing portion 46 has the diameter gradually decreasing from the center portion 473 of the roller toward each of the small diameter portions (end portions) 412 of the roller.

In the pulverizing mechanism 2C having the above structure, a pressure against the sheet shaped material Q1 becomes the highest at the vicinity of the center portion 423 and decreases as the distance from the center portion 423. This makes it is possible for the pulverized composition Q2 produced by pulverizing the sheet shaped material Q1 using the fourth embodiment of the present invention to have a broader particle size distribution than a particle size distribution of the pulverized composition Q2 produced by pulverizing the sheet material Q1 using the first embodiment of the present invention. In a case of adjusting the particle size distribution of the pulverized composition Q2, for example, a case in which it is desirable to increase fine pulverized composition and decrease coarse pulverized composition, the pulverizing mechanism 2c is useful (effective).

While the descriptions are given to the pulverizing apparatus and the pulverizing method according to the present invention shown in the drawings, the present invention is not limited thereto. Each component constituting the pulverizing apparatus is substituted for an arbitrary component having the same function as it. Further, arbitrary structures also may be added thereto.

Further, the pulverizing apparatus and the pulverizing method of the present invention may be made by combining two or more of the arbitrary structures (features) in one of the embodiments described above.

While each of the rollers of the pulverizing apparatus according to the present invention has the core portion and the outer layer constituted of the ceramic material, the present invention is not limited thereto. Whole of the roller may be constituted of the ceramic material.

Further, while each of the rollers of the pulverizing apparatus according to the present invention has the core portion having the cylindrical shape with the hollow portion, the present invention is not limited thereto. For example, the roller may have a core portion having a columnar shape without the hollow portion.

Further, each of the rollers of the pulverizing apparatus according to the present invention may have minimal convex-concave portions (patterns) formed on the outer layer thereof. This makes it possible to prevent the pulverized composition from adhering to the outer layers of the rollers.

Further, the cooling device of the pulverizing apparatus according to the present invention may have a circulating fan for circulating the cool air. The circulating fan is provided in the chamber of the cooling device.

INDUSTRIAL APPLICABILITY

With the present invention, since a resin composition is cooled, it is possible to prevent the resin composition from being heated by friction between the resin composition and outer peripheral surface of each of rollers. If the resin composition is produced by cooling and solidifying a kneaded composition and the resin composition is heated by the friction, the resin composition has viscosity again. However, since the resin composition is cooled by the present invention, it is possible to prevent the resin composition from having the viscosity. This makes it possible to reliably prevent the resin composition pulverized between the rollers from adhering to and remaining on the outer peripheral surfaces of the rollers.

In addition, even if fragments of the outer peripheral surface are produced by the friction between the resin composition and the outer peripheral surfaces of the rollers during the resin composition being pulverized, the fragments of the outer peripheral surface are obviously constituted of a ceramic material. In contrast, in a case in which the outer peripheral surfaces of the rollers are constituted of a metallic material, if pulverized metals are produced by the friction between the resin composition and the outer peripheral surfaces of the rollers during the resin composition being molded, the pulverized metals are mixed into the resin composition. However, in the pulverizing apparatus according to the present invention, it is possible to reliably prevent the pulverized metals from being mixed into the resin material. For the reasons stated above, the present invention is industrially applicable.

What is claimed is:

1. A pulverizing apparatus for pulverizing a sheet-shaped hard resin composition into a pulverized hard resin composition by pressuring the sheet-shaped hard resin composition, the pulverizing apparatus cooling the sheet-shaped hard resin composition and the pulverized hard resin composition, the pulverizing apparatus comprising:

a pulverizing mechanism having a pair of rollers arranged parallel to one another, these rollers pulverizing the sheet-shaped hard resin composition by pressuring the sheet-shaped hard resin composition between the rollers; and a cooling device for cooling the sheet-shaped hard resin composition during the sheet-shaped hard resin composition being pulverized, wherein each of the rollers has a cylindrical shape with a hollow portion, wherein the cooling device is configured to supply a coolant into the hollow portion of each of the rollers and has facilitating members for facilitating a flow of the coolant, and the facilitating members are respectively inserted into the hollow portions of the rollers so as to be respectively rotated together with the rollers, wherein each of the facilitating members has a main body having a columnar shape and an outer surface and a spirally projecting portion outwardly and spirally projecting from the outer surface of the main body, wherein the main body has an inflow passage for introducing the coolant into the hollow portion of the roller and an outflow passage for discharging the coolant from the hollow portion of the roller, wherein the inflow passage is formed at one end portion of the main body and the outflow passage is formed at the other end portion of the main body, wherein the coolant is introduced into the hollow portion of each of the rollers through the inflow passage of each of the facilitating members, spirally flows in the hollow portion of each of the rollers in only one longitudinal direction thereof due to the spirally projecting portion of each of the facilitating members when each of the rollers rotates and then is discharged from the hollow portion of each of the rollers through the outflow passage of each of the facilitating members, wherein the cooling device has a chamber in which cool air is supplied during the sheet-shaped hard resin composition being pulverized and the chamber contains the rollers, the sheet-shaped hard resin composition and the pulverized hard resin composition therein, wherein the chamber has at least two supply ports for supplying the cool air into the chamber and the supply ports are installed on a side wall of the chamber and arranged so as to be opposite to each other through the rollers in a direction perpendicular to the longitudinal direction of each of the rollers, wherein the at least two supply ports are arranged so as to directly blow the cool air to the sheet-shaped resin hard composition and an outer peripheral surface of each of the rollers, wherein the rollers are configured to be capable of adjusting a center distance between axes of the pair of rollers, wherein the pair of rollers comprises a first roller and a second roller, the first roller is restricted so as not to be moved in a direction perpendicular to the axis of the first roller, and the second roller is configured to be capable of being moved in a direction perpendicular to the axis of the second roller, wherein the pulverizing mechanism further has a biasing portion for biasing the second roller toward the first roller and a restricting portion for restricting the second roller not to move to the first roller over a limit of movement against a bias power from the biasing portion, wherein the restricting portion has one end portion bend into a L shape and contacting with a housing containing the axis of the second roller, the other end portion supported by the side wall of the chamber and a fixing member slidably provided so as to be opposite to the one end portion, and wherein the biasing portion is constituted of a coil spring, one end portion of the coil spring contacts with the housing and the other end portion of the coil spring contacts with the fixing member of the restricting portion.

2. The pulverizing apparatus as claimed in claim 1, wherein a temperature of the coolant is in the range of −5 to 5° C.

3. The pulverizing apparatus as claimed in claim 1, wherein a temperature of the cool air is in the range of −5 to 5° C.

4. The pulverizing apparatus as claimed in claim 1, wherein the outer peripheral surface of each of the rollers is constituted of a ceramic material.

5. The pulverizing apparatus as claimed in claim 4, wherein each of the rollers has a core portion containing the hollow portion and an outer layer provided on an outer periphery of the core portion, the core portion is constituted of a metallic material and the outer layer is constituted of the ceramic material.

6. The pulverizing apparatus as claimed in claims 1, wherein each of the rollers has an outer diameter changing portion having an outer diameter changing along with a longitudinal direction of each of the rollers.

7. The pulverizing apparatus as claimed in claim 6, wherein the outer diameter changing portion has the outer diameter gradually increasing from a center portion of the roller toward both end portions of the roller.

8. The pulverizing apparatus as claimed in claim 6, wherein the outer diameter changing portion of each of the rollers has the outer diameter gradually decreasing from a center portion of each of the rollers toward both end portions of each of the rollers.

9. The pulverizing apparatus claimed in claim 1, wherein a thickness of the sheet-shaped hard resin composition is in the range of 0.5 to 3 mm and a clearance between the outer peripheral surfaces of the rollers is in the range of 1 to 2 mm.

* * * * *